United States Patent
Lee et al.

(10) Patent No.: US 9,462,072 B2
(45) Date of Patent: Oct. 4, 2016

(54) AD-HOC NETWORK SYSTEM USING SELECTIVE DATA COMPRESSION ALGORITHM, AND DATA TRANSMISSION METHOD IN AD-HOC NETWORK

(71) Applicants: EWHA UNIVERSITY-INDUSTRY COLLABORATION FOUNDATION, Seoul (KR); UNIVERSITY-INDUSTRY COOPERATION GROUP OF KYUNG HEE UNIVERSITY, Yongin-si (KR)

(72) Inventors: HyungJune Lee, Seoul (KR); Hyun Seok Kim, Seoul (KR); Ye Lim Youn, Bucheon-si (KR); Ik Joon Chang, Seoul (KR)

(73) Assignees: EWHA UNIVERSITY-INDUSTRY COLLABORATION, Seoul (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 14/443,024

(22) PCT Filed: Jan. 7, 2015

(86) PCT No.: PCT/KR2015/000129
§ 371 (c)(1),
(2) Date: May 14, 2015

(87) PCT Pub. No.: WO2015/105322
PCT Pub. Date: Jul. 16, 2015

(65) Prior Publication Data
US 2015/0373137 A1 Dec. 24, 2015

(30) Foreign Application Priority Data
Jan. 13, 2014 (KR) ........................ 10-2014-0003731

(51) Int. Cl.
*H04L 29/08* (2006.01)
*H04W 40/10* (2009.01)
*H04W 84/18* (2009.01)
*H04B 7/155* (2006.01)
*H04L 12/24* (2006.01)

(52) U.S. Cl.
CPC ....... *H04L 67/2828* (2013.01); *H04B 7/15507* (2013.01); *H04L 41/0833* (2013.01); *H04W 40/10* (2013.01); *H04W 84/18* (2013.01); *Y02B 60/50* (2013.01)

(58) Field of Classification Search
CPC H04B 7/15507; H04W 4/005; H04W 40/10; H04W 84/18; H04L 41/0833; H04L 67/2828; Y02B 60/40; Y02B 60/50
USPC ........................................................ 370/311
See application file for complete search history.

(56) References Cited

U.S. PATENT DOCUMENTS 5,131,016 A 7/1992 Broughton et al.

FOREIGN PATENT DOCUMENTS

| KR | 10-2009-0083014 A | 8/2009 |
| KR | 10-2010-0064462 A | 6/2010 |
| KR | 10-2013-0090282 A | 8/2013 |
| KR | 20130090282 | * 8/2013 |

* cited by examiner

Primary Examiner — Raymond Dean
(74) Attorney, Agent, or Firm — Paratus Law Group, PLLC

(57) ABSTRACT

A data transmission method in an ad-hoc network includes: a determining step in which a data sink node determines information of a route from a source node to the data sink node and a kind of data collected by the source node; a selecting step in which the data sink node selects a target node to compress data from the source node and a relay node with respect to the source node to minimize estimated total energy consumption of the network and a kind of a compression algorithm to be used by the target node using the information of the route and the kind of data; an informing step in which the data sink node informs the target node of data compression information including the kind of a compression algorithm depending on the information of the route and the kind of data; and a compressing and transmitting step in which the target node compresses collected or received data according to the data compression information and transmits the data.

16 Claims, 6 Drawing Sheets

AD-HOC NETWORK SYSTEM USING SELECTIVE DATA COMPRESSION ALGORITHM, AND DATA TRANSMISSION METHOD IN AD-HOC NETWORK

TECHNICAL FIELD

The following description relates to a method of compressing and transmitting data in an ad-hoc network. The following description is the result of the research conducted as a fundamental research project by support from the National Research Foundation of Korea, which was funded by the Government (Ministry of Science, ICT and Future Planning) in 2013 (Project Serial Nos.: NRF-2013R1A1A1009854, NRF-2013R1A1A1005832).

BACKGROUND ART

In recent years, a sensor network or an M2M network is being extensively researched.

Most studies of a sensor network are about using energy with efficiency in a sensor network since sensor nodes use limited energy. Sensor node could use a technique of compressing data collected by the sensor node for saving energy.

DISCLOSURE

Technical Problem

There is a prior technique of transmitting compressed data for saving energy in a sensor network. However, the prior technique just suggests a compression algorithm for compressing data in a node (a source node) collecting the data.

The following description is directed to providing a data compression technique for minimizing energy consumption in an ad-hoc network such as a sensor network.

Technical Solution

An ad-hoc network using a selective data compression algorithm includes: a source node configured to collect data; a data sink node configured to receive the data collected by the source node; and a relay node positioned in a route from the source node to the data sink node and configured to transfer the data. Herein, the data sink node determines at least one of the source node and the relay node as a target node to compress the data based on estimated total energy consumption of the ad-hoc network, and the target node compresses the collected data or the received data and transmits the data.

The data sink node may determine a kind of a compression algorithm to be used by the target node, and the target node may compress the data depending on the determined kind of a compression algorithm.

The data sink node may determine any one of each source node of multiple source nodes or at least one relay node positioned in the route from each source node to the data sink node as a node to compress the data collected by each source node such that the estimated total energy consumption can be minimized while a critical time condition in which the data collected by the source node need to be transferred to the data sink node is satisfied.

A data transmission method in an ad-hoc network includes: a determining step in which a data sink node determines information of a route from a source node to the data sink node and CPU computational energy to be required for compression depending on a kind of data collected by the source node; a selecting step in which the data sink node selects a target node to compress data from the source node and a relay node with respect to the source node to minimize estimated total energy consumption of the network and a kind of a compression algorithm to be used by the target node using the information of the route and CPU computational energy; an informing step in which the data sink node informs the target node of data compression information including the kind of a compression algorithm depending on the information of the route and the kind of data; and a compressing and transmitting step in which the target node compresses collected or received data according to the data compression information and transmits the data.

In the selecting step, the data sink node may select any one of each source node of multiple source nodes or at least one relay node positioned in the route from each source node to the data sink node as the target node to compress the data collected by each source node, and may select a compression algorithm to be used by the determined target node.

In the selecting step, the data sink node may select any one of each source node of multiple source nodes or at least one relay node positioned in the route from each source node to the data sink node as the target node to compress the data collected by each source node such that the estimated total energy consumption can be minimized while a critical time condition in which the data collected by the source node need to be transferred to the data sink node is satisfied.

In the selecting step, the data sink node may select the target node and the compression algorithm such that the estimated energy consumption can be minimized based on at least one of CPU computational energy, radio energy after data compression, and CPU computational energy consumed for data decompression while a critical time condition in which the data collected by the source node need to be transferred to the data sink node is satisfied.

In the selecting step, when the source node is provided in multiple and at least two source nodes of the multiple source nodes share at least one relay node positioned in a route to the data sink node, the data sink node may select at least one shared relay node as the target node such that the number of target nodes selected based on at least one of CPU computational energy, radio energy after data compression, and CPU computational energy consumed for data decompression and the sum of estimated energy consumption can be minimized.

Advantageous Effects

The following description dynamically determines a node to perform data compression and minimizes energy consumed in the overall network accordingly. The following description prolongs a life time of a system and reduces network maintenance costs by minimizing energy consumption of an ad-hoc network such as a sensor network.

BEST MODE

Figure 1:
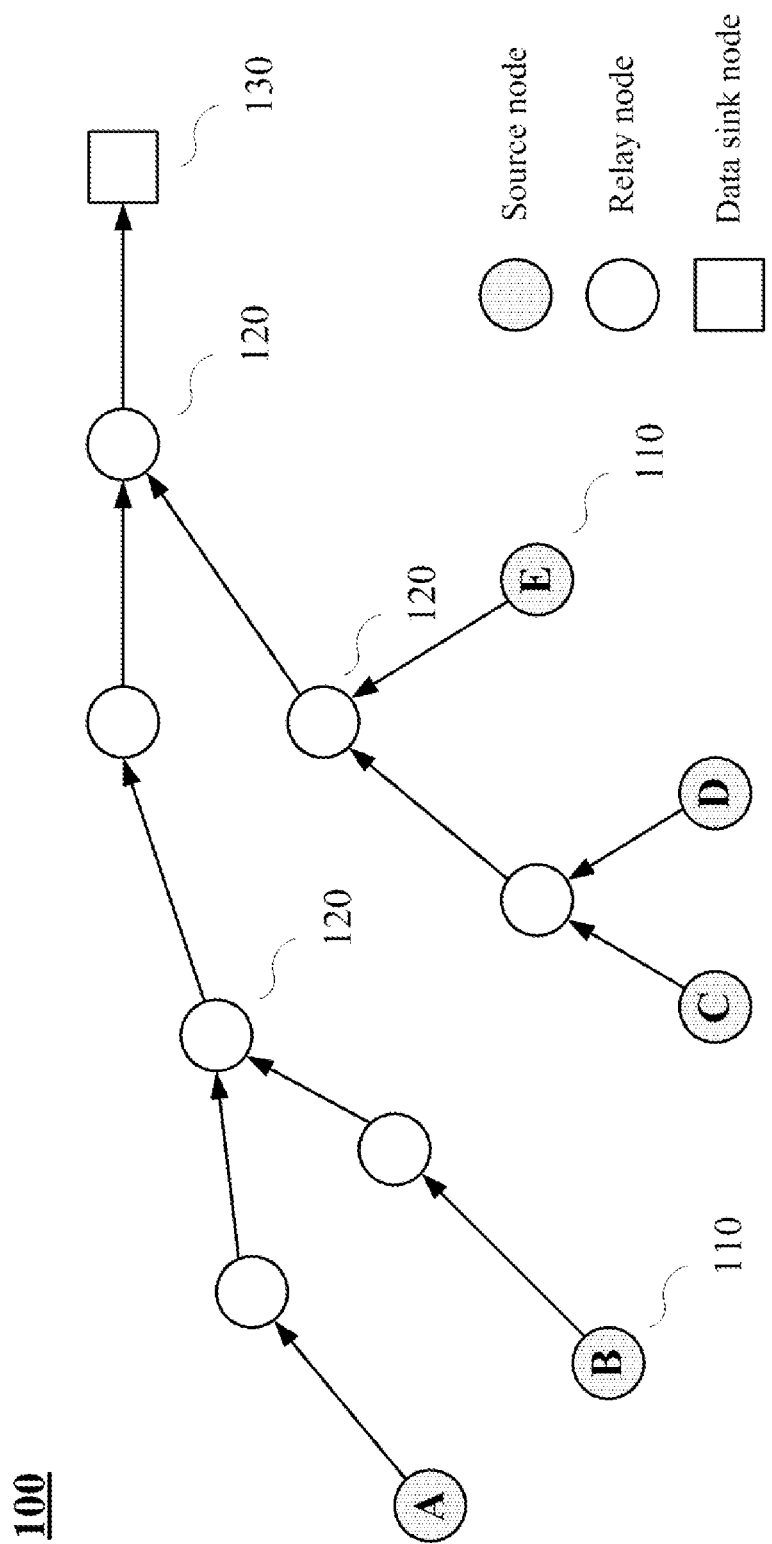
FIG. 1 illustrates an example of a configuration of an ad-hoc network system.

The present invention can be modified and changed in various ways and can be embodied in various forms, and thus, The following example will now be described in detail with reference to the accompanying drawings. However, it should be noted that the present invention is not limited to the exemplary embodiments, but all modifications, equivalents, or substitutes within the spirit and scope of the following example will be construed as being included in the present invention.

It will be understood that, although the terms "first", "second", "A", "B", and the like may be used herein in explaining various elements of the example, such elements should not be limited by these terms, but are only used to distinguish one element from another. For example, a first element could be termed a second element, and similarly, a second element could be termed a first element, without departing from the scope of the following example. As used herein, the term "and/or" includes any and all combinations of one or more of the associated listed items.

As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before describing the drawings in detail, it should be noted that the distinction of elements is for distinguishing the main function of each element. That is, two or more elements to be described below can be joined as one element, or an element can be functionally divided into two or more elements. Moreover, each element to be described below can perform not only its main function but also part or whole of the functions of other elements. Conversely, it is also possible that a part of the main functions pertained to each element can be fully performed by other elements.

In addition, in performing a method or an operational method, each process constituting the method may be performed in an order different from a specified order as long as a specific order is not explicitly and contextually specified. That is, each process may be performed in the same order as the specified order, performed substantially simultaneously, or performed in reverse order.

The following example can be applied to a network system in which a device, such as a sensor node, configured to collect specific data transfers the data through an ad-hoc network. That is, the following example can be applied to a network having a structure in which a source node configured to collect data transfers the data to a specific data sink node through one or more relay nodes. Accordingly, the following example can be applied to a sensor network and can also be applied to an M2M (Machine-to-Machine) network having an ad-hoc structure.

Several terms to be used hereinafter are defined in advance so as to be used in a unified manner. A node (device), such as a sensor node, configured to collect data is termed "source node." A node (device) configured to finally receive the data collected by the source node and process or manage the data is termed "data sink node." A node positioned in a route from the source node to the data sink node and configured to relay the data transferred from the source node is termed "relay node." A route in which the data collected by the source node are transferred to the data sink node is termed "data route." A node configured to perform a data compression is termed "target node."

The source node is configured to collect data using a specific sensor device, transmit the data using a communication module (device), and receive a signal such as a control instruction. The relay node is configured to transfer data using a communication module and transmit/receive a signal such as a control instruction. The data sink node is configured to receive data using a communication module and transmit/receive a signal such as a control instruction. The source node or the relay node can compress data, and such a compression operation is performed by a predetermined operation unit (CPU). The data sink node can also determine a target node using a predetermined operation unit. Further, a separate cluster device connected with the data sink node may determine a target node. However, hereinafter, it will be described that instead of a specific component or element of each node, a specific node including the component performs the above-described process. Further, it will be described that the data sink node determines a target node. In this case, the data sink node may include the separate cluster device connected to the data sink node.

Hereinafter, an ad-hoc network system 100 using a selective data compression algorithm and a data transmission method 500 in an ad-hoc network will be described in detail with reference to the accompanying drawings.

FIG. 1 illustrates an example of a configuration of an ad-hoc network system. The ad-hoc network system 100 typically includes multiple source nodes 110, multiple relay nodes 120, and a data sink node as illustrated in FIG. 1. Typically, each node transmits/receives data and control instructions by wireless communication. FIG. 1 illustrates five source nodes 110 denoted by A, B, C, D, and E. The source nodes 110 and the relay nodes 120 are respectively expressed by circles, and the source nodes 110 are distinguished from the relay nodes 120 by multiple small dots and alphabets. The data sink node is expressed by a square.

The source node can compress data collected by the source nodes 110 and then transmit the compressed data in the example. All of the source nodes 110 could compress data which are collected respectively and at least one of the source node could 110 compress data collected by a specific source node. Further, the target node configured to perform compression may be the source nodes 110 or may be one of the relay nodes 120. However, once the target node compresses the data collected by the specific source node 110, the compressed data do not need to be compressed again during in a subsequent route.

The example determines whether or not to compress data and determines a target node based on several standards (conditions). At the same time, the example may consider a critical time condition in which specific data need to be transferred from the source nodes 110 to the data sink node. The several standards may include energy to be consumed in the ad-hoc network. The energy includes radio energy for data transmission, operation energy (hereinafter, referred to as "CPU energy") for data compression, and CPU energy for data decompression. The points which need to be considered in association with the critical time condition include a time to be consumed for data transmission between the nodes (hop), a hop distance, and a time to be consumed for data decompression in the target node. The example determines the target node in consideration of the above-described conditions such that energy of the overall ad-hoc network can be minimized.

Further, in the case of using various kinds of compression algorithms, compressibility, a compression time, and CPU energy to be consumed for compression need to be considered with respect to each compression algorithm. In data compression, compressibility, a compression time, and CPU energy may be different based on a kind of data. Therefore, the source nodes 110 should consider a kind of data in selecting a compression algorithm.

The example has two modes in operation. In the first mode source node 100 selects target node(s) and a compression algorithm to minimize total ad-hoc network energy consumption without considering the number of target nodes. And in the second mode, source node 100 selects target node(s) and a compression algorithm to minimize total ad-hoc network energy consumption and also the number of target nodes. The ad-hoc network 100 using a selective data compression algorithm comprises the source nodes 110 configured to collect data, the data sink node 130 configured to receive the data collected by the source nodes 110, and the relay nodes 120 positioned in a route from the source nodes 110 to the data sink node 130 and configured to transfer the data.

Herein, the data sink node 130 determines at least one of the source nodes 110 and the relay nodes 120 as a target node to compress the data based on estimated total energy consumption of the ad-hoc network. The estimated total energy consumption basically means energy to be consumed when all of the source nodes 110 collect and transmit data. Otherwise, in some cases, the estimated total energy consumption may mean energy to be consumed when only a specific source node 110 collects and transmits data. Hereinafter, the estimated total energy consumption will be assumed as energy to be consumed when the source nodes 110 being currently operated and capable of transmitting data collect and transmit data.

Then, if the determined target node is the source node 110, the source node 110 compresses the collected data and transmits the compressed data. And if the determined target node is the relay node 120, the relay node 120 compresses the received data and transmits the compressed data.

The data sink node 130 could determine a specific compression algorithm to be used by the target node when the target node could use a plurality of compression algorithms, and then the target node compresses the data depending on the determined compression algorithm. In a single ad-hoc network, a compression algorithm to be used may be different for each target node. Further, even for the same target node, a compression algorithm may be different depending on a kind of data to be collected by the source nodes 110.

S-LZW algorithm and an RLE-ST algorithm are widely used in a sensor network for data compression (refer to C. M. Sadler and M. Martonosi, "Data compression algorithms for energy-constrained devices in delay tolerant networks" In ACM SenSys, 2006.). The S-LZW refers to an algorithm with a higher compressibility and takes a rather long computation time and consumes more CPU energy as compared with the RLE-ST. The RLS-ST refers to a simple algorithm as compared with the S-LZW and takes a shorter computation time and takes less CPU energy but has a lower compressibility. The computation time needs to be considered in association with the critical time condition for data transmission, and the CPU energy needs to be considered in association with the estimated total energy consumption.

The data sink node 130 may determine any one of each source node 110 of the multiple source nodes 110 or any one relay node 120 positioned in a route from each source node 110 to the data sink node 130 as a target node to compress the data collected by each source node 110. And the data sink node 130 may also determine a compression algorithm to be used by the target node.

The data sink node 130 may determine any one of each source node 110 of the multiple source nodes 110 or any one relay node 120 positioned in a route from each source node 110 to the data sink node 130 as a target node to compress the data collected by the source node 110 such that the estimated total energy consumption can be minimized while a critical time condition in which the data collected by the source node 110 need to be transferred to the data sink node 130 is satisfied.

Figure 2:
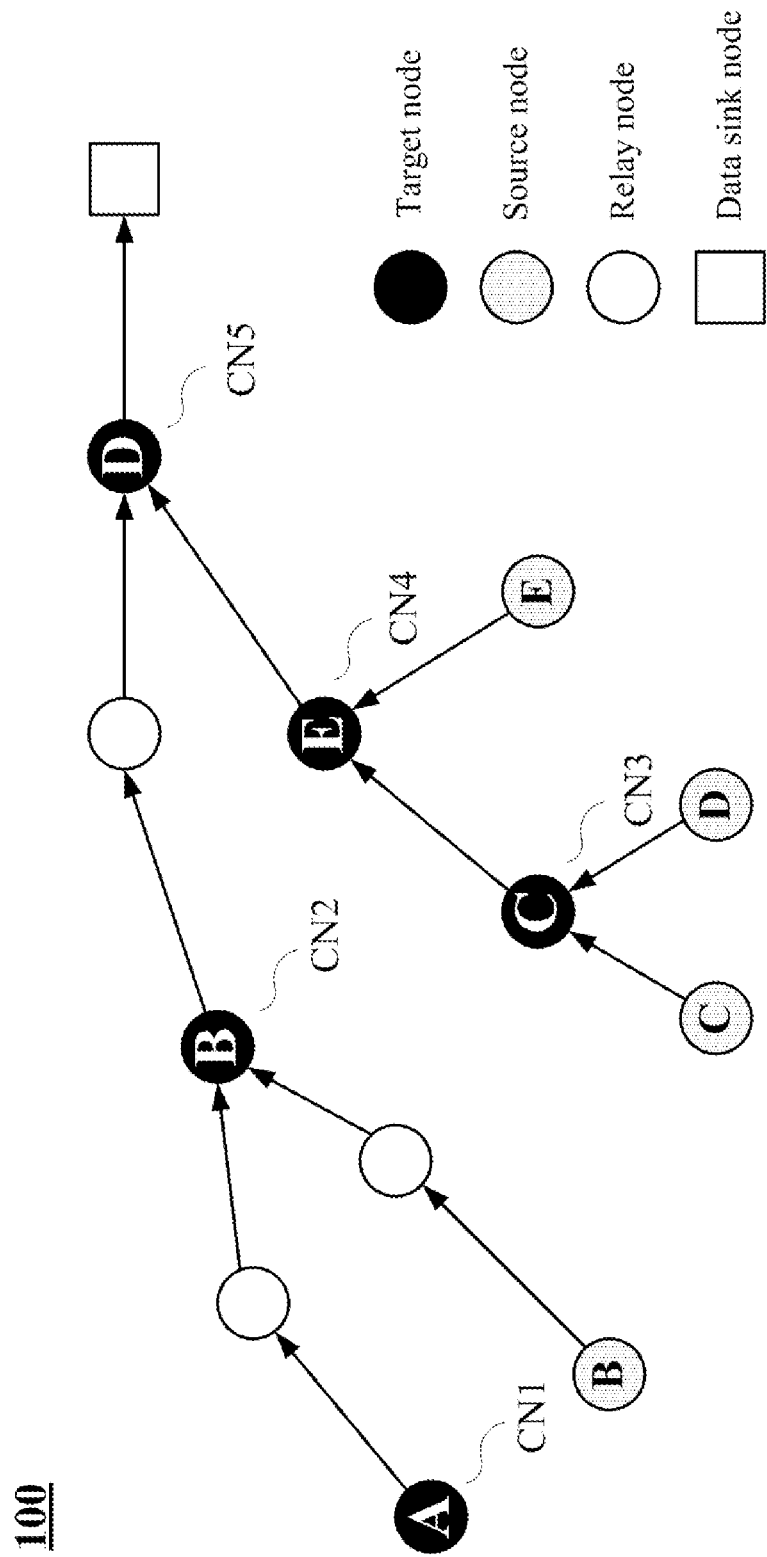
FIG. 2 illustrates an example of an operation of an ad-hoc network system using a selective data compression algorithm.

FIG. 2 illustrates an example of an operation of an ad-hoc network system using a selective data compression algorithm. FIG. 2 may be an example of the above-described first mode. Among the source nodes 110 or the relay nodes 120, the nodes respectively expressed by diagonal lines with alphabets are target nodes. That is, a target node for a source node A is a source node A (CN1), a target node for a source node B is a source node (CN2), a target node for a source node 110 (C) is a relay node (CN3), a target node for a source node 110 (D) is a relay node (CN5), and a target node for a source node 110 (E) is a relay node (CN4).

Although FIG. 2 illustrates a case where target nodes for all the source nodes 110 are determined. However, in some case target nodes for at least one of the source nodes 110 could not be determined. In other words, the at least one of the source nodes 110 could transfer the data to the data sink node 130 without data compression based on a selective data compression. For example, if data A collected by the source node A has a low compressibility and it takes a long time to perform compression, the data A may be transmitted without compression in consideration of a critical time for data transmission. Typically, data having a high compressibility refer to data including much redundant data. For example, temperature data which are measured in real time are maintained at a certain level for a certain time period without a rapid change. Therefore, the temperature data have a high data compressibility.

When the data sink node 130 determines a target node and a compression algorithm, the data sink node 130 may use a binary integer programming as represented by the following formulation. Several indicators and variables used in the formula will be explained as follow.

$$I_{src_i, comp_k, type_t} = \begin{cases} 1 & \text{if selected,} \\ 0 & \text{otherwise.} \end{cases} \quad \text{[Indicator 1]}$$

Herein, $src_i$ means any one source node 110 $i$, $comp_k$ means a target node k for the $src_i$, and $type_t$ means a compression algorithm t for the $src_i$. Herein, i and k are integers and within the range of the sum (s+r) of the number (s) of the source nodes 110 and the number (r) of the relay nodes 120. That is, i and k denote node IDs. Herein, t is an integer within the range of the number (m) of all kinds of compression algorithms, and $type_t$ means a kind of a specific compression algorithm. Also, $type_t$ refers to a value corresponding to a kind of data to be collected by the source nodes 110 because a compression algorithm to be used may vary depending on a kind of data.

$I_{src_i,comp_k,type_t}$ is an indicator which has a value of 1 if the target node $comp_k$ using the compression algorithm $type_t$ for the specific source node 110 $src_i$ is determined, or has a value of 0 otherwise.

$$J_{src_i} = \begin{cases} 1 & \text{in case of no compression for } src\ ID\ i, \\ 0 & \text{otherwise.} \end{cases} \quad \text{[Indicator 2]}$$

$J_{src_i}$ is an indicator which has a value of 1 if compression for the specific source node 110 $src_i$ is not performed, or has a value of 0 otherwise.

As a result, Indicator 1 is mutually exclusive with Indicator 2.

That is, $\Sigma_{k,t} I_{src_i,comp_k,type_t} + J_{src_i} = 1$.

The data sink node 130 can determine a target node and a compression algorithm for the source node 110 using the following Formula 1. FIG. 2 may be an example of determining a target node using the following Formula 1.

$$\text{minimize} \left( \sum_{k,t} \overline{E}_T \cdot h_{i \to k} + E_{C,t} + E_{T,t} \cdot h_{k \to dst} + E_{D,t} \right) \cdot \quad \text{[Formula 1]}$$
$$I_{src_i,comp_k,type_t} + (\overline{E}_T \cdot h_{i \to dst}) \cdot J_{src_i}$$

Herein, dst is a data sink node 130, $\overline{E}_T$ is radio energy for transmitting/receiving data without data compression, $E_{T,t}$ is radio energy for transmitting/receiving data after data compression using the compression algorithm t, $E_{C,t}$ is CPU computational energy to be consumed for data compression using $type_t$, $E_{D,t}$ is CPU computational energy to be consumed for data decompression using $type_t$, and $h_{i \to j}$ is a hop distance between a node i and a node j.

Formula 1 can be computed under the condition that conditions represented by the following Formula 2 and Formula 3 are satisfied.

$$\sum_{k,t} I_{src_i,comp_k,type_t} + J_{src_i} = 1 \forall\ i \quad \text{[Formula 2]}$$

As described above, Formula 2 means that $I_{src_i,comp_k,type_t}$ is mutually exclusive with $J_{src_i}$.

$$\left( \sum_{k,t} \Delta_T \cdot h_{i \to k} + \Delta_{C,t} + \Delta_T \cdot h_{k \to dst} + \Delta_{D,t} \right) \cdot I_{src_i,comp_k,type_t} + \quad \text{[Formula 3]}$$
$$(\Delta_T \cdot h_{i \to dst}) \cdot J_{src_i} \leq T_{max}$$

Formula 3 relates to a critical time ($T_{max}$) condition in which data collected by the source node 110 need to be transferred to the data sink node 130. The critical time condition may vary depending on a characteristic of the system, setup of a manger, or a kind of a service using the data.

Herein, $\Delta_T$ is a hop delay time, $\Delta_{C,t}$ is a time required for data compression using $type_t$ in a target node, $\Delta_{D,t}$ is a time required for data decompression using $type_t$ in the data sink node 130, and $T_{max}$ is a critical time in which data need to be transferred from the source node 110 to the data sink node 130.

Figure 3:
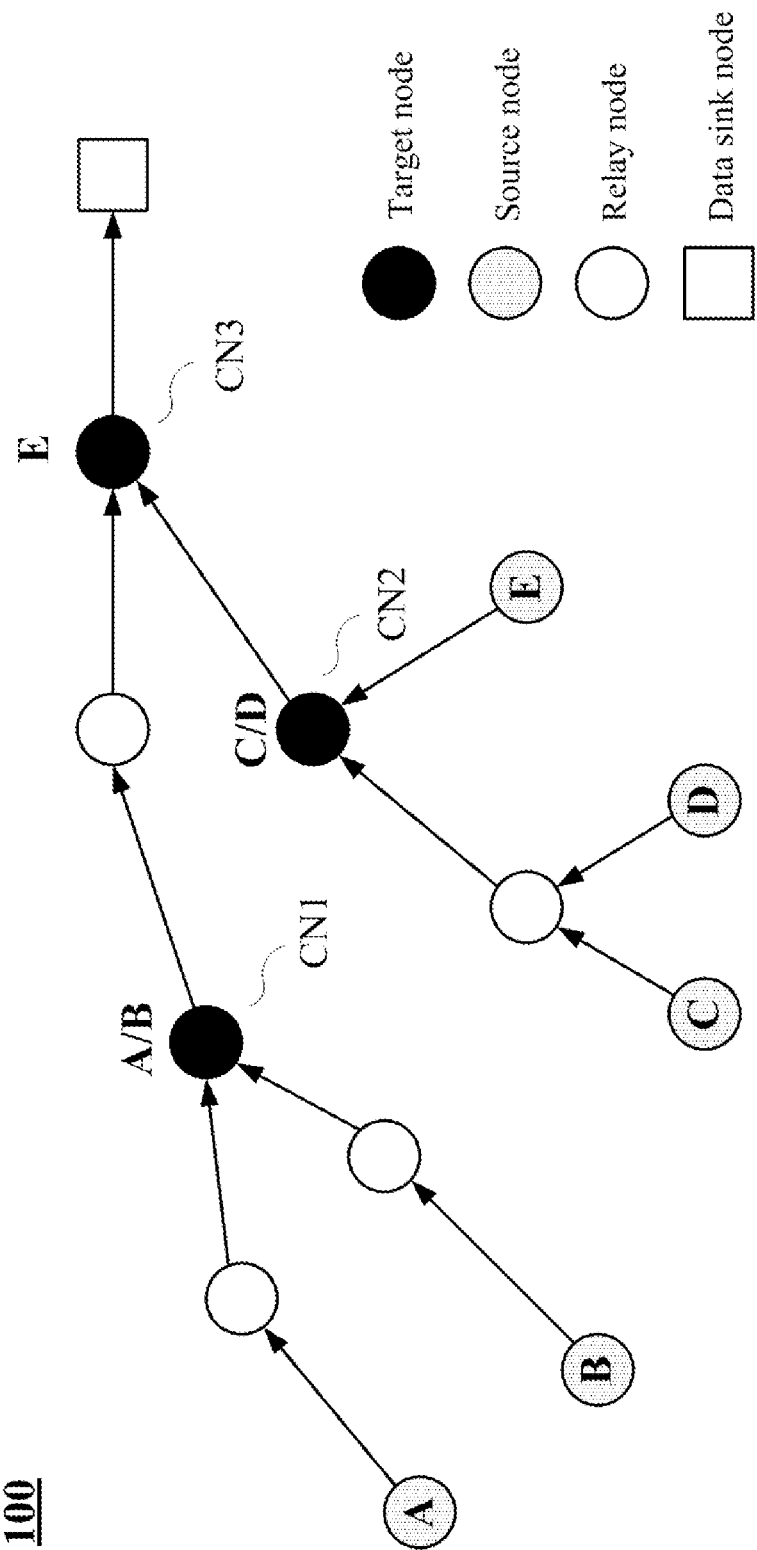
FIG. 3 illustrates an example of an operation of an ad-hoc network system using a selective data compression algorithm.

FIG. 3 illustrates another example of an operation of an ad-hoc network system using a selective data compression algorithm. FIG. 3 is an example of the above-described second mode. FIG. 3 illustrates a case where target nodes are overlapped with respect to the multiple source nodes 110 unlike FIG. 2. CN1 among the relay nodes shared between the source node A and the source node B is a common target node for the source node A and the source node B, CN2 among the relay nodes shared between the source node C and the source node D is a common target node for the source node C and the source node D, and the source node E uses a target node CN3 alone instead of using a common target node.

The second mode refers to a case where a target node and a compression algorithm are selected in an additional condition of minimizing the number of target nodes. The target nodes (CN1 and CN2) that compress data collected by two or more source nodes 110 take more time and consume more energy for compression. However, when a common target node is used as illustrated in FIG. 3, estimated total energy consumption may be reduced. For example, when the source node A and the source node B useless compression time and less CPU energy due to small amount of data collected, a common target node for the source node A and the source node B have higher energy efficiency than two target nodes for each the source node A and the source node B.

The data sink node 130 could select at least one of the shared relay nodes 120 as a target node such that the number of target nodes and estimated total energy consumption can be minimized.

The indicators used in the second mode will be explained first.

$$\tilde{I}_k = \begin{cases} 1 & \text{in node k is selected for compression,} \\ 0 & \text{otherwise.} \end{cases} \quad \text{[Indicator 3]}$$

$\tilde{I}_k$ is an indicator which has a value of 1 if a node k is selected as a target node for data compression, or has a value of 0 otherwise. The node in the indicator includes the source node 110 and the relay node 120 which can be a target node.

The data sink node 130 can determine a target node and a compression algorithm for the source node 110 using the following Formula 4.

$$\text{minimize} \left( \sum_{k,t} \overline{E}_T \cdot h_{i \to k} + E_{C,t} + E_{T,t} \cdot h_{k \to dst} + E_{D,t} \right) \cdot \quad \text{[Formula 4]}$$
$$I_{src_i,comp_k,type_t} + (\overline{E}_T \cdot h_{i \to dst}) \cdot J_{src_i} + \gamma \cdot \sum_k \tilde{I}_k$$

Herein, $src_i$ means any one source node 110 i, $comp_k$ means a target node k for the $src_i$, $type_t$ means a compression algorithm t for the $src_i$, dst is a data sink node 130, $\overline{E}_T$ is radio energy for transmitting/receiving data without data compression, $E_{T,t}$ is radio energy for transmitting/receiving data after data compression using the compression algorithm t, $E_{C,t}$ is CPU computational energy to be consumed for data compression using $type_t$, $E_{D,t}$ is CPU computational energy to be consumed for data decompression using $type_t$, $h_{i \to j}$ is a hop distance between a node i and a node j, and $\gamma$ is the penalizing weight for the number of resulting target nodes, $$\gamma \cdot \sum_k \tilde{I}_k$$

means a condition for the number of target nodes. That is, it is a condition for minimizing the number of selected target nodes.

Formula 4 could be computed under the condition satisfying conditions of the following Formula 5, Formula 6, and Formula 7.

$$\sum_{k,t} I_{src_i, comp_k, type_t} + J_{src_i} = 1 \forall i \quad \text{[Formula 5]}$$

As described above, Formula 5 means that $I_{src_i, comp_k, type_t}$ is mutually exclusive with $J_{src_i}$.

$$\left( \sum_{k,t} \Delta_T \cdot h_{i \to k} + \Delta_{C,t} + \Delta_T \cdot h_{k \to dst} + \Delta_{D,t} \right) \cdot I_{src_i, comp_k, type_t} + \quad \text{[Formula 6]}$$

$$(\Delta_T \cdot h_{i \to dst}) \cdot J_{src_i} \leq T_{max}$$

Formula 6 relates to a critical time ($T_{max}$) condition. $\Delta_T$ is a hop delay time, $\Delta_{C,t}$ is a time required for data compression using $type_t$ in a target node, $\Delta_{D,t}$ is a time required for data decompression using $type_t$ in the data sink node 130, and $T_{max}$ is a critical time in which data need to be transferred from the source node 110 to the data sink node 130.

$$I_{src_i, comp_k, type_t} \leq \tilde{I}_k \forall i, \forall t \quad \text{[Formula 7]}$$

According to Formula 7, if the target node k ($comp_k$) for the source node 110 $src_i$ and the compression algorithm $type_t$ is determined, $\tilde{I}_k$ has a value of 1, and, thus, the total number of $\tilde{I}_k$ becomes the number of target nodes.

The data sink node 130 or the computer cluster device connected to the data sink node 130 can compute the above-described formulas for determining a target node using a commercial tool AMPL/CPLEX.

Figure 4:
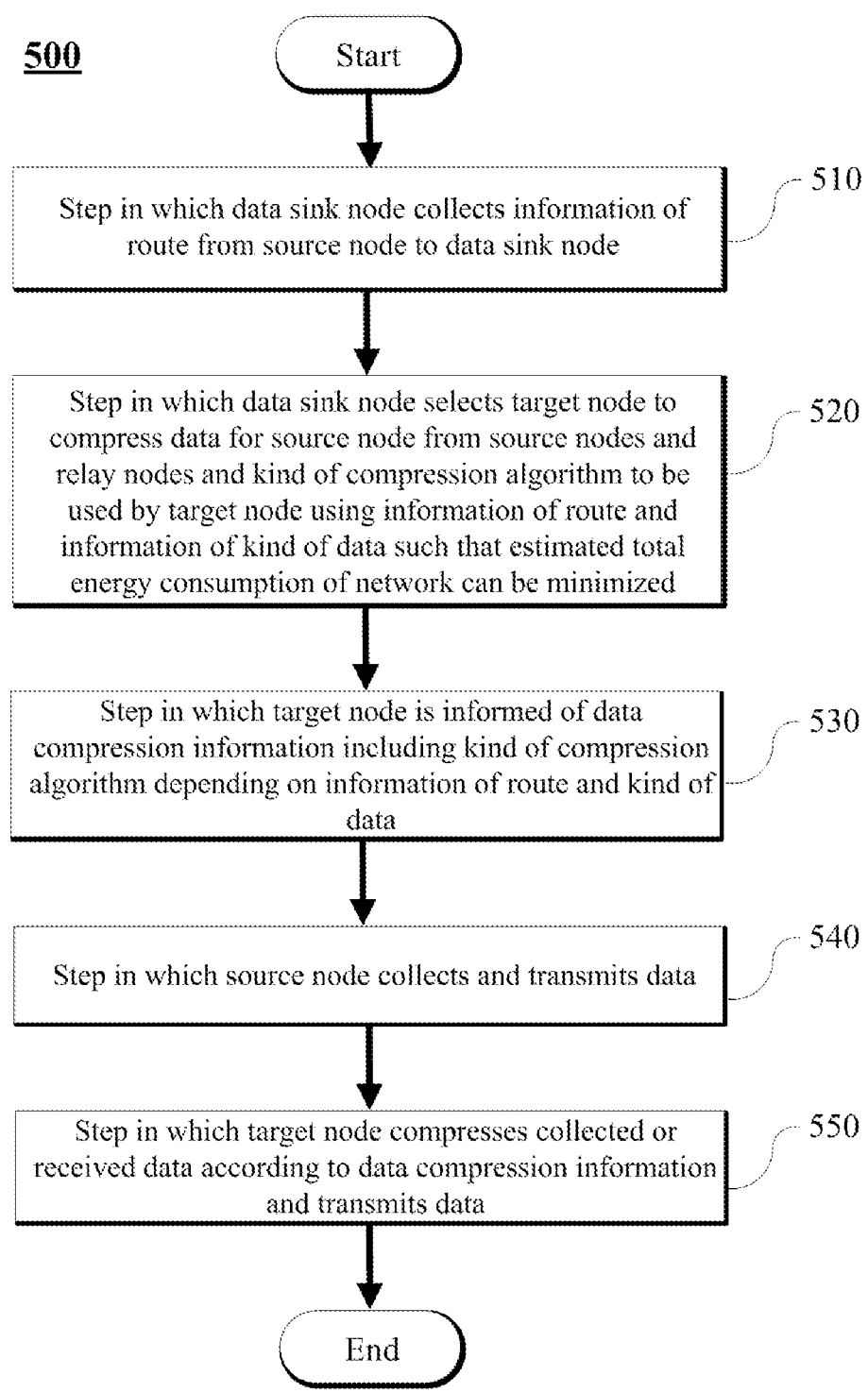
FIG. 4 illustrates an example of a flow chart of a data transmission method in an ad-hoc network.

FIG. 4 illustrates an example of a flow chart of a data transmission method in an ad-hoc network. Similar descriptions of the above-described ad-hoc network system 100 will be omitted or briefly described in the follow description of the method 500

In the data transmission method 500 in an ad-hoc network, the data sink node 130 collects information of a route from the source node 110 to the data sink node 130 (510). It is possible to determine a target node for data collected by the source node 110 only when basic information of the route is obtained. Further, it is desirable to find a kind of data collected by the source node 110 by actually receiving data from the source node 110 in the step 510 because a compression algorithm to be used could be determined depending on a kind of data. Accordingly, a compression algorithm, CPU energy generated during compression and decompression, and a computation time required for compression could be determined according to a kind of data.

The data sink node 130 selects i) a target node to compress data from the source nodes 110 and the relay nodes 120 and ii) a kind of a compression algorithm to be used by the target node based on the information of the route and the information of a kind of the data such that estimated total energy consumption of the network can be minimized (520).

Then, the data sink node 130 informs the target node of data compression information including the kind of a compression algorithm depending on the information of the route and a kind of the data (530). And after the source node 110 collects data (540), the target node compresses the data according to the data compression information and transmits the compressed data (550).

Only the target node may be informed of the data compression information, or all the source nodes 110 and the relay nodes 120 in a route may be informed of the data compression information.

Herein, the data compression information may be tabulated with items such as source node 110's ID, target node ID, and kind of compression algorithm. For example, the data compression information including the source node 110 i, the target node k, and the compression algorithm t indicates an instruction that the target node k should compress data transmitted from the source node 110 i using the specific compression algorithm t according to a kind of the data is delivered.

The data sink node 130 could select a target node and a compression algorithm to be used by the target node using Formula 1 or Formula 4 described above.

Figure 5:
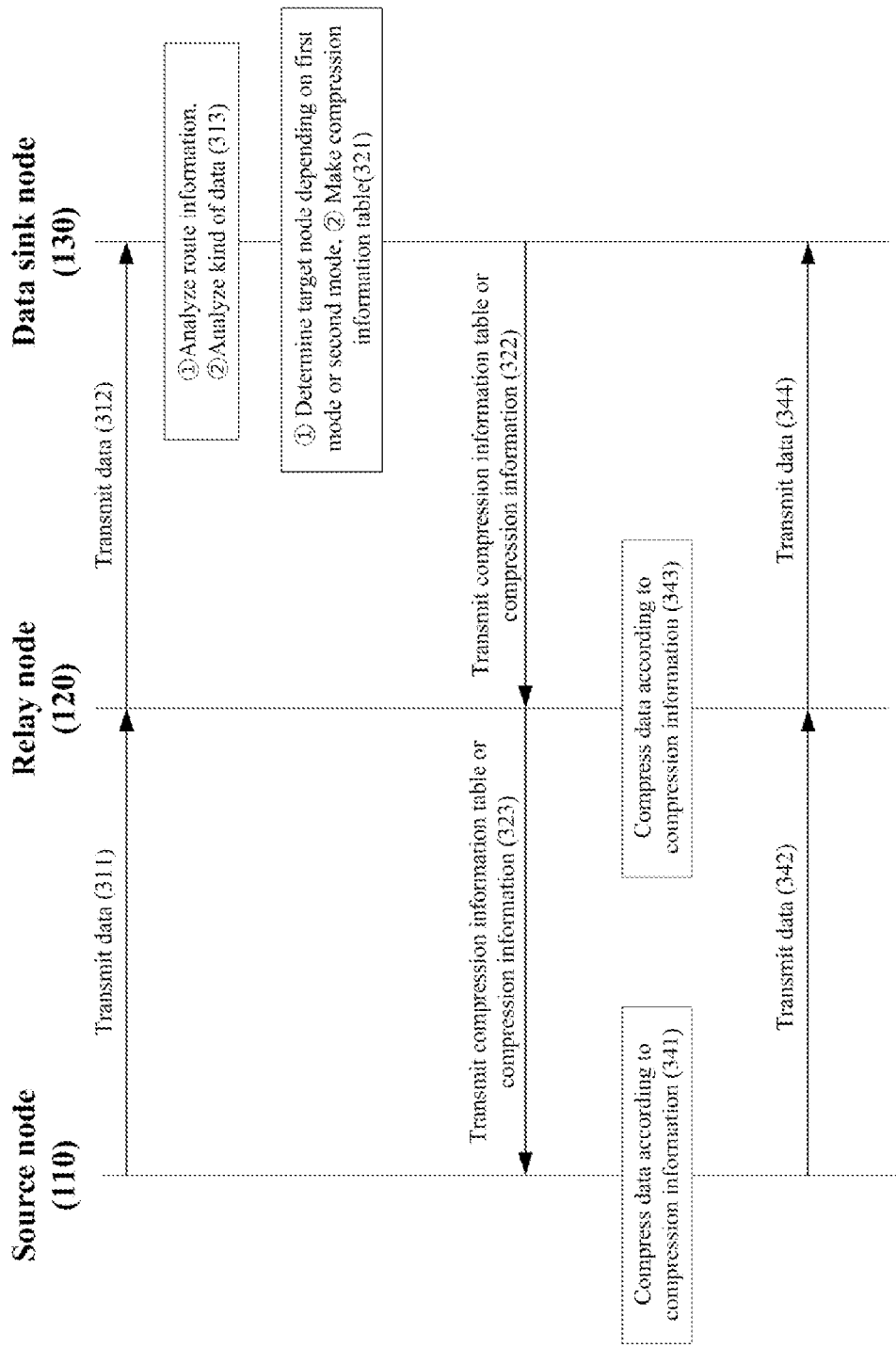
FIG. 5 illustrates an example of a data transmission process among elements of an ad-hoc network.

FIG. 5 illustrates an example of a data transmission process among elements of an ad-hoc network. Firstly, collected data are transmitted from the source node 110 to the relay node 120 (311), and then, the collected data collected by the source node 110 are transmitted to the data sink node 130 through the relay node 120 (312). The data transmitted in this process include the data collected by the source node 110 and route data (route information) in which ID information of nodes through which the data pass is stored in sequence. The route data may be stored in a header of the collected data.

The data sink node 130 finds a route through which the data are transferred by analyzing the received route information and determines a kind of the received data (313). The data sink node 130 compresses the received data using various compression algorithms and determines compressibility to be achieved, CPU energy to be consumed for compression, a time required for compression, and the like.

The route information and the compression information for the kind of the data are used to determine a target node later. The data sink node 130 determines a target node depending on the first mode or the second mode and generates compression information (321). The generated compression information or a compression information table in the form of a table as described above are transmitted to the target node or all of the relay nodes 120 and the source nodes 110 present in the route (322 and 323).

Then, the source node 110 collects data, and if the source node 110 is set as a target node for the data in the compression information table, the source node 110 (target node) compresses the data according to the compression information (341). The data compressed when the source node 110 is a target node are transmitted to the relay node 120 (342), and the relay node 120 transmits the data to the data sink node 130 (344).

The source node 110 collects the data and transmits the data the relay node 120 (342), and if the relay node 120 is a target node, the relay node 120 compresses the data according to the compression information (343). Then, the relay node 120 transmits the compressed data to the data sink node 130 along the route (344).

Figure 6:
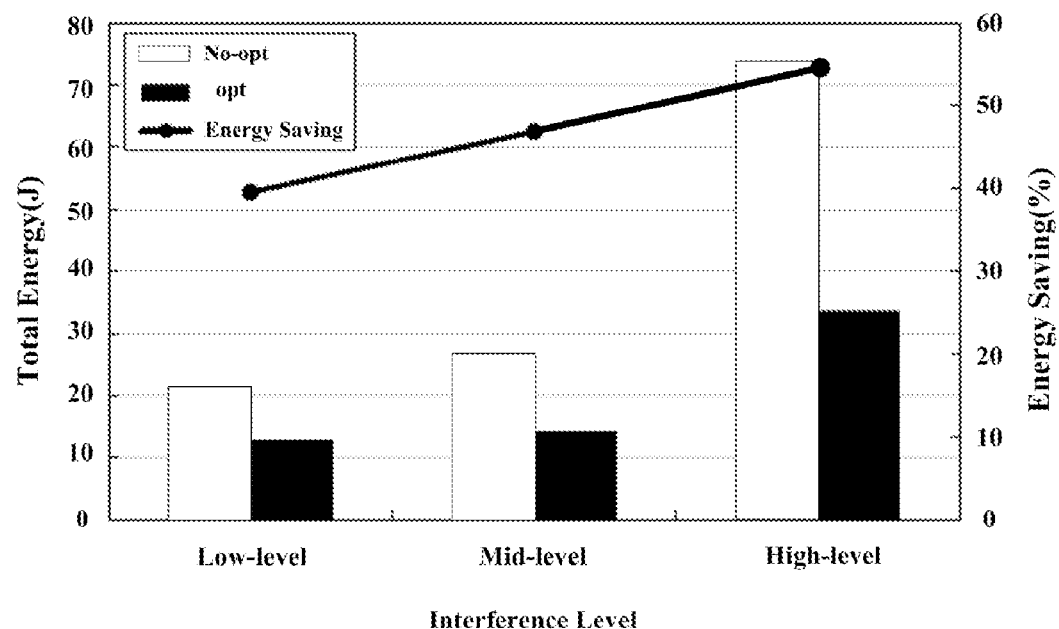
FIG. 6 illustrates a result of an experiment on performance of an ad-hoc network system using a selective data compression algorithm.

FIG. 6 illustrates a result of an experiment on performance of an ad-hoc network system using a selective data compression algorithm. In the graph of FIG. 6, the term "no-opt" refers to data transmission in a normal state where data compression is not performed, and the term "opt" refers to data transmission in a state where selective data compression is performed according to the above-described method.

Referring to FIG. 6, it can be seen that when the selective data compression is performed, network energy consumption is low. Further, it can be seen that in a severe signal interference condition, network energy consumption is further reduced. This is because transmission failures frequently occur in a severe signal interference condition and retransmission of compressed data consumes less energy. In other words, this means that during data transmission, radio energy is more consumed than energy used for compression.

The exemplary embodiments and the accompanied drawings of the present invention have been described for simply describing a part of the technical spirit of the present invention, and it is obvious that all modifications and specific embodiments easily conceivable by those skilled in the art within the scope of the technical spirit included in the specification and drawings of the present invention belong to the scope of the right of the present invention.

DESCRIPTION OF MAIN REFERENCE NUMERALS OF DRAWINGS

100: Ad-hoc network using a selective data compression algorithm
110: Source node
120: Relay node
130: Data sink node

The invention claimed is:

1. An ad-hoc network using a selective data compression algorithm comprising:
a source node configured to collect data;
a data sink node configured to receive the data collected by the source node; and
a relay node positioned in a route from the source node to the data sink node and configured to transfer the data,
wherein the data sink node determines at least one of the source node and the relay node as a target node to compress the data based on estimated total energy consumption of the ad-hoc network, and the target node compresses the collected data or the received data and transmits the data.

2. The ad-hoc network using a selective data compression algorithm of claim 1, wherein the data sink node determines a kind of a compression algorithm to be used by the target node, and the target node compresses the data depending on the determined kind of a compression algorithm.

3. The ad-hoc network using a selective data compression algorithm of claim 1, wherein the data sink node determines the target node such that the estimated total energy consumption is minimized in consideration of at least one of information of the route from the source node to the data sink node, a kind of the data collected by the source node, or a critical time in which the data collected by the source node need to be transferred to the data sink node.

4. The ad-hoc network using a selective data compression algorithm of claim 1, wherein the energy consumption comprises radio energy to be consumed for data transmission in the source node and the relay node, CPU energy to be consumed for data compression, and CPU energy to be consumed for data decompression.

5. The ad-hoc network using a selective data compression algorithm of claim 1, wherein the source node is provided in multiple, and the data sink node determines any one of each source node of the multiple source nodes or at least one relay node positioned in the route from each source node to the data sink node as the target node to compress the data collected by each source node and determines a compression algorithm to be used for compression in the target node.

6. The ad-hoc network using a selective data compression algorithm of claim 1, wherein the source node is provided in multiple, and the data sink node determines any one of each source node of the multiple source nodes or at least one relay node positioned in the route from each source node to the data sink node as the target node to compress the data collected by each source node such that the estimated total energy consumption is minimized while a critical time condition in which the data collected by the source node need to be transferred to the data sink node is satisfied.

7. The ad-hoc network using a selective data compression algorithm of claim 1, wherein the data sink node determines a target node and a compression algorithm for a source node using the following formula:

$$\text{minimize} \left( \sum_{k,t} \overline{E}_T \cdot h_{i \rightarrow k} + E_{C,t} + E_{T,t} \cdot h_{k \rightarrow dst} + E_{D,t} \right) \cdot I_{src_i, comp_k, type_t} + (\overline{E}_T \cdot h_{i \rightarrow dst}) \cdot J_{src_i}$$

(wherein $src_i$ means any one source node i, $comp_k$ means a target node k for the $src_i$, $type_t$ means a compression algorithm t for the $src_i$, dst is the data sink node, $\overline{E}_T$ is radio energy for transmitting/receiving data without data compression, $E_{T,t}$ is radio energy for transmitting/receiving data after data compression using the compression algorithm t, $E_{C,t}$ is CPU computational energy to be consumed for data compression using $type_t$, $E_{D,t}$ is CPU computational energy to be consumed for data decompression using $type_t$, $h_{i \rightarrow j}$ is a hop distance between a node i and a node j, $I_{src_i, comp_k, type_t}$ has a value of 1 if the $comp_k$ performing $type_t$ compression for $src_i$ is determined, or has a value of 0 otherwise, and $J_{src_i}$ has a value of 1 if compression for $src_i$ is not performed, or has a value of 0 otherwise).

8. The ad-hoc network using a selective data compression algorithm of claim 7, wherein the formula satisfies a condition expressed by the following formula:

$$\left( \sum_{k,t} \Delta_T \cdot h_{i \rightarrow k} + \Delta_{C,t} + \Delta_T \cdot h_{k \rightarrow dst} + \Delta_{D,t} \right) \cdot I_{src_i, comp_k, type_t} + (\Delta_T \cdot h_{i \rightarrow dst}) \cdot J_{src_i} \leq T_{max}$$

(wherein $\Delta_T$ is a hop delay time, $\Delta_{C,t}$ is a time required for data compression using $type_t$ in a target node, $\Delta_{D,t}$ is a time required for data decompression using $type_t$ in the data sink node, and $T_{max}$ is a critical time in which data need to be transferred from the source node to the data sink node).

9. The ad-hoc network using a selective data compression algorithm of claim 1, wherein when the source node is provided in multiple and at least two source nodes of the multiple source nodes share at least one relay node positioned in a route to the data sink node, the data sink node selects at least one shared relay node as the target node such that the number of target nodes and the estimated total energy consumption are minimized.

10. The ad-hoc network using a selective data compression algorithm of claim 1, wherein the data sink node selects the target node and the compression algorithm for the source node using the following formula:

$$\text{minimize}\left(\sum_{k,t} \overline{E}_T \cdot h_{i \to k} + E_{C,t} + E_{T,t} \cdot h_{k \to dst} + E_{D,t}\right) \cdot I_{src_i,comp_k,type_t} +$$

$$(\overline{E}_T \cdot h_{i \to dst}) \cdot J_{src_i} + \gamma \cdot \sum_k \tilde{I}_k$$

(wherein $src_i$ means any one source node i, $comp_k$ means a target node k for the $src_i$, $type_t$ means a compression algorithm t for the $src_i$, dst is the data sink node, $\overline{E}_T$ is radio energy for transmitting/receiving data without data compression, $E_{T,t}$ is radio energy for transmitting/receiving data after data compression using the compression algorithm t, $E_{C,t}$ is CPU computational energy to be consumed for data compression using $type_t$, $E_{D,t}$ is CPU computational energy to be consumed for data decompression using $type_t$, $h_{i \to j}$ is a hop distance between a node i and a node j, $I_{src_i,comp_k,type_t}$ has a value of 1 if the $comp_k$ performing $type_t$ compression for $src_i$ is determined, or has a value of 0 otherwise, $J_{src_i}$ has a value of 1 if compression for $src_i$ is not performed, or has a value of 0 otherwise, $\gamma$ is a penalizing weight for the number of resulting target nodes, and $\tilde{I}_k$ has a value of 1 if a node k is selected as a target node, or has a value of 0 otherwise).

11. The ad-hoc network using a selective data compression algorithm of claim 10, wherein the formula satisfies a condition expressed by the following formula:

$$\left(\sum_{k,t} \Delta_T \cdot h_{i \to k} + \Delta_{C,t} + \Delta_T \cdot h_{k \to dst} + \Delta_{D,t}\right) \cdot I_{src_i,comp_k,type_t} +$$

$$(\Delta_T \cdot h_{i \to dst}) \cdot J_{src_i} \leq T_{max}$$

$$I_{src_i,comp_k,type_t} \leq \tilde{I}_k \; \forall \, i, \, \forall \, t$$

(wherein $\Delta_T$ is a hop delay time, $\Delta_{C,t}$ is a time required for data compression using $type_t$ in a target node, $\Delta_{D,t}$ is a time required for data decompression using $type_t$ in the data sink node, and $T_{max}$ is a critical time in which data need to be transferred from the source node to the data sink node).

12. A data transmission method in an ad-hoc network including a source node, a relay node, and a data sink node, the data transmission method comprising:

a determining step in which the data sink node determines information of a route from the source node to the data sink node and a kind of data collected by the source node;

a selecting step in which the data sink node selects a target node to compress data from the source node and the relay node with respect to the source node to minimize estimated total energy consumption of the network and a kind of a compression algorithm to be used by the target node using the information of the route and the kind of data;

an informing step in which the data sink node informs the target node of data compression information including the kind of a compression algorithm depending on the information of the route and the kind of data; and a compressing and transmitting step in which the target node compresses collected or received data according to the data compression information and transmits the data.

13. The data transmission method of claim 12, wherein in the selecting step, the data sink node selects any one of each source node of multiple source nodes or at least one relay node positioned in the route from each source node to the data sink node as the target node to compress the data collected by each source node, and selects a compression algorithm to be used by the determined target node.

14. The data transmission method of claim 12, wherein in the selecting step, the data sink node selects any one of each source node of multiple source nodes or at least one relay node positioned in the route from each source node to the data sink node as the target node to compress the data collected by each source node such that the estimated total energy consumption is minimized while a critical time condition in which the data collected by the source node need to be transferred to the data sink node is satisfied.

15. The data transmission method of claim 12, wherein in the selecting step, the data sink node selects the target node and the compression algorithm such that the estimated energy consumption is minimized based on at least one of the CPU computational energy, radio energy after data compression, and CPU computational energy consumed for data decompression while a critical time condition in which the data collected by the source node need to be transferred to the data sink node is satisfied.

16. The data transmission method of claim 12, wherein in the selecting step, when the source node is provided in multiple and at least two source nodes of the multiple source nodes share at least one relay node positioned in a route to the data sink node, the data sink node selects at least one shared relay node as the target node such that the number of target nodes selected based on at least one of the CPU computational energy, radio energy after data compression, and CPU computational energy consumed for data decompression and the sum of estimated energy consumption are minimized.

* * * * *